US008525872B2

(12) United States Patent
Choi et al.

(10) Patent No.: US 8,525,872 B2
(45) Date of Patent: Sep. 3, 2013

(54) METHOD FOR DISPLAYING A THREE-DIMENSIONAL IMAGE AND DISPLAY APPARATUS FOR PERFORMING THE SAME

(75) Inventors: Hee-Jin Choi, Seoul (KR); Jun-Pyo Lee, Cheonan-si (KR); Jung-Won Kim, Seoul (KR); Sang-Soo Kim, Seoul (KR); Bong-Hyun You, Yongin-si (KR)

(73) Assignee: Samsung Display Co., Ltd. (KR)

( * ) Notice: Subject to any disclaimer, the term of this patent is extended or adjusted under 35 U.S.C. 154(b) by 534 days.

(21) Appl. No.: 12/715,673

(22) Filed: Mar. 2, 2010

(65) Prior Publication Data
US 2010/0253678 A1    Oct. 7, 2010

(30) Foreign Application Priority Data

Apr. 6, 2009  (KR) .............................. 2009-0029467

(51) Int. Cl.
*H04N 13/04*        (2006.01)
(52) U.S. Cl.
USPC ........................................... 348/51; 345/419
(58) Field of Classification Search
USPC .................... 348/42–60; 345/419
See application file for complete search history.

(56) References Cited

U.S. PATENT DOCUMENTS

| 6,088,052 A * | 7/2000 | Guralnick ........................ 348/51 |
| 6,448,952 B1 * | 9/2002 | Toyoda et al. .................. 345/97 |
| 6,456,432 B1 * | 9/2002 | Lazzaro et al. ................ 359/464 |
| 2001/0043266 A1 * | 11/2001 | Robinson et al. ............... 348/53 |
| 2003/0112507 A1 * | 6/2003 | Divelbiss et al. ............. 359/464 |
| 2003/0223499 A1 * | 12/2003 | Routhier et al. ......... 375/240.25 |
| 2005/0117637 A1 * | 6/2005 | Routhier et al. ......... 375/240.01 |
| 2008/0284719 A1 * | 11/2008 | Yoshida ........................ 345/102 |

FOREIGN PATENT DOCUMENTS

| JP | 09051552 A * | 2/1997 |
| JP | 2005-175566 A | 6/2005 |
| KR | 1020060087711 A | 8/2006 |
| KR | 1020070102932 A | 10/2007 |

* cited by examiner

*Primary Examiner* — Sath V Perungavoor
*Assistant Examiner* — Dakshesh Parikh
(74) *Attorney, Agent, or Firm* — Cantor Colburn LLP

(57) ABSTRACT

A method for displaying a three-dimensional ("3D") image includes; dividing the 3D image input from an external device into a first image frame corresponding to a first eye of a viewer and a second image frame corresponding to a second eye of the viewer, and generating a first compensation frame and a second compensation frame subsequent to the first image frame and the second image frame, respectively, and displaying the first compensation frame and the second compensation frame on a display panel.

21 Claims, 16 Drawing Sheets

METHOD FOR DISPLAYING A THREE-DIMENSIONAL IMAGE AND DISPLAY APPARATUS FOR PERFORMING THE SAME

This application claims priority to Korean Patent Application No. 2009-29467, filed on Apr. 6, 2009, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a method for displaying a three-dimensional ("3D") image and a display apparatus for performing the method. More particularly, exemplary embodiments of the present invention relate to a method for displaying a 3D image capable of improving display quality and a display apparatus for performing the method.

2. Description of the Related Art

Nowadays, as demand for three-dimensional ("3D") images in computer games, movies, etc. is increasing, interest in 3D image display apparatuses capable of displaying 3D images is also increasing.

A 3D image display apparatus displays a first image for a left eye and a second image for a right eye, the two images having binocular disparity, so that the first and second images are shown to the left eye and the right eye, respectively, of an observer. The observer respectively sees the first image with the left eye and the second image with the right eye, and the observer's brain interprets the first image and the second image to perceive a 3D effect.

The 3D image display apparatus may typically be classified as using either a glasses method or a non-glasses method. The non-glasses method may include a parallax barrier method or a lenticular method. The non-glasses method may allow the 3D image to be seen without glasses, but observation positions may be limited. Accordingly, the non-glasses method has a limitation in that a plurality of observers may not be able to simultaneously perceive a 3D effect of high quality.

Alternatively, the glasses method may include an anaglyph method, typically using blue and red glasses with a red or blue filter for each eye, respectively, or a liquid crystal shutter glasses method, in which a time-divisional screen is repeated at a certain interval and glasses having liquid crystal shutters synchronized with the interval are used.

The 3D image display apparatus employing the liquid crystal shutter glasses method alternately displays the first image for the left eye and the second image for the right eye, and embodies the 3D image by opening and closing the liquid crystal shutters attached to the liquid crystal shutter glasses in accordance with a displayed image.

When an image displayed on the display panel is converted from the first image for the left eye to the second image for the right eye or from the second image for the right eye to the first image for the left eye, the image is typically sequentially converted from top to bottom line-by-line. Alternatively, the liquid crystal shutters of the liquid crystal shutter glasses may be opened and closed instantaneously. Accordingly, a process converting from the first image for the left eye to the second image for the right eye or from the second image for the right eye to the first image for the left eye is shown to an observer's eyes. When the images, which may have a time difference for both eyes and be divided according to the time difference, are mixed, wrong images may be shown for the left eye and the right eye. As a result, the observer may see overlapped images, and thus eye fatigue may be generated.

BRIEF SUMMARY OF THE INVENTION

Exemplary embodiments of the present invention provide a method for displaying a three-dimensional ("3D") image capable of improving display quality.

Exemplary embodiments of the present invention also provide a display apparatus suitable for performing the above-mentioned method.

According to one exemplary embodiment of the present invention, t a method for displaying a 3D image includes; dividing the 3D image input from an external device into a first image frame corresponding to a first eye and a second image frame corresponding to a second eye of the viewer, and generating a first compensation frame and a second compensation frame subsequent to the first image frame and the second image frame, respectively, and displaying the first image frame, the first compensation frame, the second image frame and the second compensation frame on a display panel.

According to an exemplary embodiment of the present invention, a display apparatus includes; a display panel which displays an image, and an image processing device which divides a 3D image frame input from an external device into a first image frame corresponding to a first eye of a viewer and a second image frame corresponding to a second eye of the viewer and which generates a first compensation frame and a second compensation frame subsequent to the first image frame and the second image frame, respectively, and which provides the first image frame, the second image frame, the first compensation frame and the second compensation frame to the display panel.

According to a method for displaying a 3D image and a display apparatus for performing the method, a compensation frame is inserted between a first image frame for a left eye and a second image frame for a right eye when the 3D image is embodied, thereby preventing the first image for the left eye and the second image for the right eye from being mixed to improve display quality.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

Figure 1:
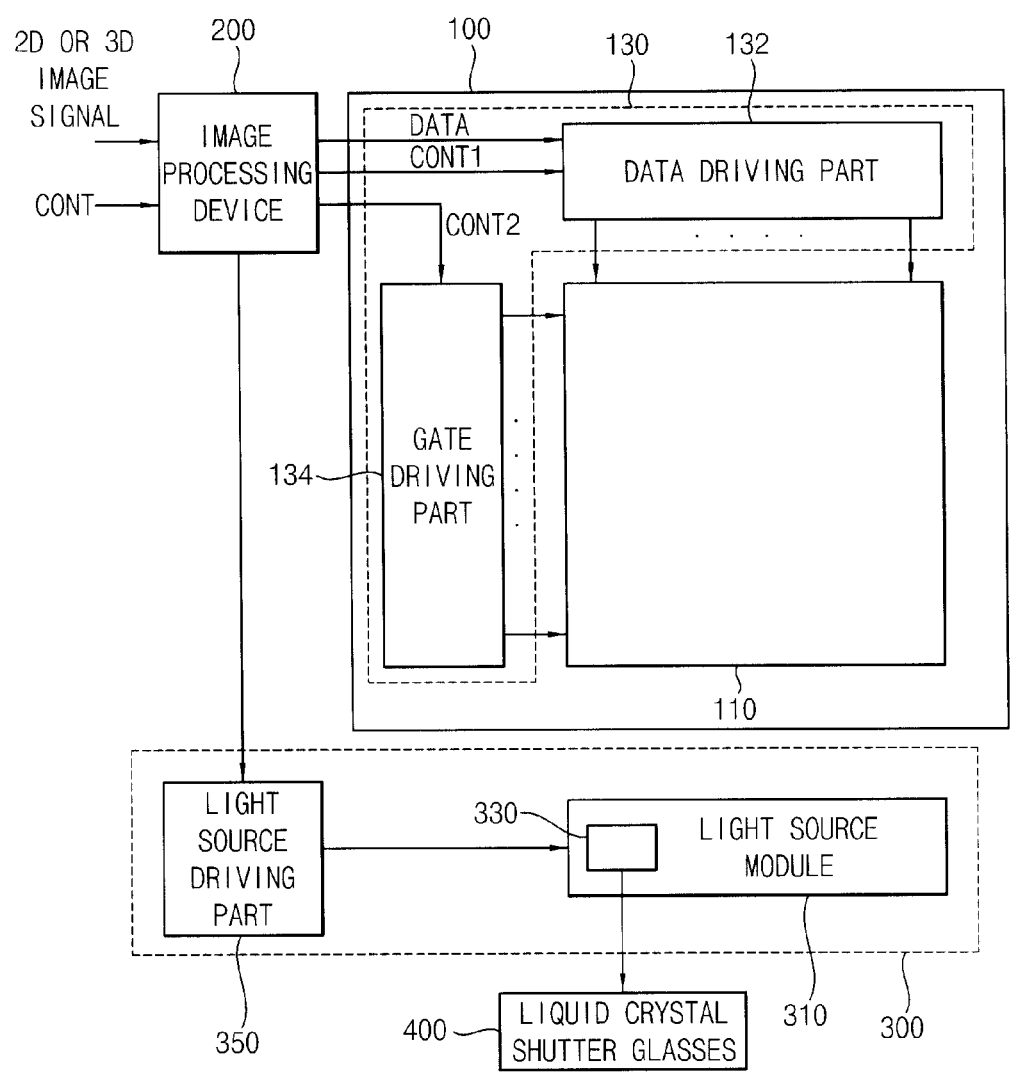
FIG. 1 is a block diagram illustrating an exemplary embodiment of a display apparatus according to the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. Like reference numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

FIG. 1 is a block diagram illustrating an exemplary embodiment of a display apparatus according to the present invention.

Referring to FIG. 1, the present exemplary embodiment of a display apparatus includes a display unit 100 and an image processing device 200 (hereinafter referred to as "an image processing board"). According to the present exemplary embodiment, the display apparatus may selectively display a two-dimensional ("2D") image and a three-dimensional ("3D") image.

The display unit 100 includes a display panel 110 and a panel driving section 130 driving the display panel 110. In one exemplary embodiment, the display panel 110 may display a high resolution including a full high definition ("FHD") resolution having a resolution of 1,920 pixels×1,080 pixels. Alternative exemplary embodiments include configurations having different resolutions.

The panel driving section 130 includes a data driving part 132 and a gate driving part 134. The display panel 110 displays an image based on data signals output from the data driving part 132 and gate signals output from the gate driving part 134.

The display panel 110 may include two substrates and a liquid crystal layer interposed between the substrates. The display panel 110 includes a plurality of pixels for displaying the image. Each of the pixels may include a switching element, e.g., a transistor, electrically connected to gate lines and data lines disposed substantially perpendicularly to the gate lines and a liquid crystal capacitor electrically connected to the switching element. Each of the pixels may further include a storage capacitor electrically connected to the transistor. Exemplary embodiments include configurations wherein the storage capacitor may be omitted.

The data driving part 132 converts a digital data signal into an analog data voltage based on a first control signal CONT1 received from the image processing board 200, to output the data voltage to the plurality of data lines. Exemplary embodiments of the first control signal CONT1 may include a horizontal start signal STH, a load signal TP, a data clock signal DCLK, and a polarity inversion signal POL.

The gate driving part 134 generates the gate signals for driving the plurality of gate lines formed on the display panel 110 based on a second control signal CONT2 received from the image processing board 200 and sequentially outputs the generated gate signals to the plurality of gate lines. Exemplary embodiments of the second control signal CONT2 may include a vertical start signal STV, a gate clock signal GCLK, and an output enable signal OE.

The image processing board 200 receives an image signal and a control signal CONT from an external video system (not shown). Exemplary embodiments include configurations wherein the image signal may be the 2D image or the 3D image. Exemplary embodiments of the control signal CONT may include a main clock signal MCLK, a vertical synchronization signal VSYNC, a horizontal synchronization HSYNC, a data enable signal DE, and various other signals. The image processing board 200 generates the first control signal CONT1 for controlling a drive timing of the data driving part 132 and the second control signal CONT2 for controlling the drive timing of the gate driving part 134 using the control signal CONT to provide the first control signal CONT1 and the second control signal CONT2.

Figure 2:
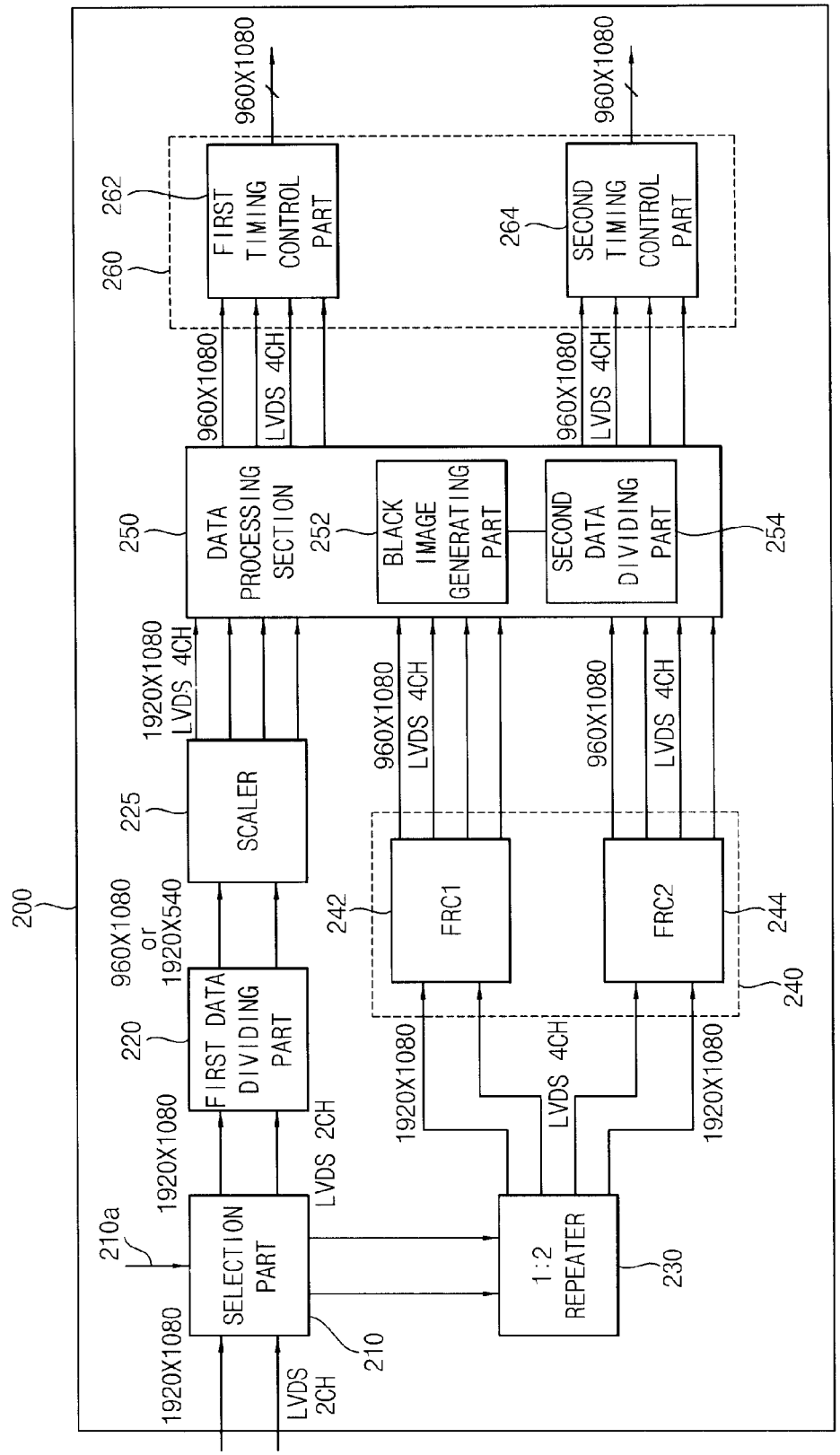
FIG. 2 is a block diagram illustrating an exemplary embodiment of the image processing board of FIG. 1.

FIG. 2 is a block diagram illustrating an exemplary embodiment of the image processing board of FIG. 1.

Referring to FIGS. 1 and 2, the image processing board 200 may include a selection part 210, a first data dividing part 220, a scaler 225, an 1:2 repeater 230, a frame rate controller section ("FRC") 240, a data processing section 250 and a timing control part 260.

The selection part 210 receives an image signal from the outside, for example in one exemplary embodiment using a low voltage differential signaling ("LVDS") method. The video system converts an interlaced image signal received from an external device into a progressive image signal.

The selection part 210 selectively outputs the image signal to the first data dividing part 220 and the 1:2 repeater 230 depending on whether a 3D enable signal 210a is received from the video system. For example, in one exemplary embodiment the selection part 210 determines the image signal as a 2D image signal to output the image signal to the 1:2 repeater 230, when the 3D enable signal 210a is not received from the outside. Conversely, in such an exemplary embodiment the selection part 210 determines the image signal as the 3D image signal to output the image signal to the first data dividing part 220 when the 3D enable signal 210a is received from the video system.

The first data dividing part 220 divides the 3D image frame received from the selection part 210 into a first image frame and a second image frame to provide the first image frame and the second image frame to the scaler 225. In the present exemplary embodiment, the first image frame is an image frame for a left eye and the second image frame is an image frame for a right eye; however, alternative exemplary embodiments include configurations wherein the order and eye-correspondence may be reversed. The image data for the left eye and the image data for the right eye are mixed in the 3D image frame. Accordingly, the first data dividing part 220 divides the 3D image frame into the first and second image frames. In one exemplary embodiment, the first and second image frames may include 960×1,080 image data or 1,920×520 image data, respectively.

The scaler 225 respectively converts the resolutions of the first and second image frames received from the first data dividing part 220 into a resolution of the display panel 110. For example, in one exemplary embodiment, the scaler 225 converts the first and second frames respectively having a resolution of 960×1,080 or a resolution of 1,920×520 into a resolution of 1,920×1,080.

In the present exemplary embodiment, the selection part 210, the first data dividing part 220 and the scaler 225 may be integrally formed on one integrated chip ("IC"). However, alternative exemplary embodiments include configurations wherein the components are formed on separate boards or chips.

The 1:2 repeater 230 transmits a 2D image frame received through two channels from the selection part 210 in the LVDS transmission method, and divides the 2D image frame into four channels to transmit to the frame rate controller section 240.

The frame rate controller section 240 includes a first frame rate control part 242 and a second frame rate control part 244. The first and second frame rate control part 242 and 244 convert frame rates of input images into a frame rate of the display panel 110, respectively. For example, in one exemplary embodiment the first and second rate control part 242 and 244 convert a frame rate of a half image of a FHD image input at about 60 Hz into about 240 Hz, respectively. In one exemplary embodiment, driving frequencies of the first and second frame rate control part 242 and 244 are about 240 Hz, respectively.

The first frame rate control part 242 generates first intermediate images having motions compensated for the first image data group corresponding to the first display area of the display panel 110 using an N-th image data of an N-th frame and an (N+1)-th image data of an (N+1)-th frame received from the 1:2 repeater 230. In the present exemplary embodiment, N is a natural number.

The second frame rate control part 244 generates second intermediate images having motions compensated for the second image data group corresponding to the second display area adjacent to the first display area using the N-th image data of the N-th frame and the (N+1)-th image data of the (N+1)-th frame received from the 1:2 repeater 230.

Since, according to the present exemplary embodiment, the display panel 110 has a resolution of 1920×1080, the first and second display areas respectively have a resolution of 960×1080. Accordingly, the first and second data groups respectively include a resolution of 960×1080. In the present exemplary embodiment, the first and second frame rate control part 242 and 244 output the first and second image data groups at a driving frequency of about 240 Hz.

The first frame rate control part 242 converts the frame rate of the image frame received from the 1:2 repeater 230 by assigning the first intermediate images between the first image data group of the N-th frame and the first image data group of the (N+1)-th frame. The first intermediate images may include images corresponding to an (N+¼)-th frame, an (N+½)-th frame and an (N+¾)-th frame between the first image data group of the N-th frame and the first image data group of the (N+1)-th frame. The second frame rate control part 244 converts the frame rate of the image frame received from the 1:2 repeater 230 by assigning the second intermediate images between the second image data group of the N-th frame and the second image data group of the (N+1)-th frame. The second intermediate images may include images corresponding to an (N+¼)-th frame, an (N+½)-th frame and an (N+¾)-th frame between the second image data group of the N-th frame and the second image data group of the (N+1)-th frame.

The first and second frame rate control parts 242 and 244 serially transmit each of the first and second image data groups which are frame-rate converted using the LVDS transmission method to the data processing part 250.

In the present exemplary embodiment, the first and second frame rate control parts 242 and 244 generate the first and second intermediate images for the first and second image data groups, respectively; however, the present exemplary embodiment is not limited to the above-mentioned embodiment. That is, the first and second frame rate control parts 242 and 244 may generate intermediate images corresponding to separate frames between the N-th frame and the (N+1)-th frame respectively for about 60 Hz input image.

The data processing section 250 receives the first and second image data groups, the frame rates of which are converted from the first and second frame rate control parts 242 and 244, and the data processing part 250 receives the first and second image frames from the scaler 225.

The data processing part 250 passes the first and second image data groups received from the first and second frame rate control parts 244 to the timing control part 260. In one exemplary embodiment, the data processing part 250 may include a black image generating part 252 and a second data dividing part 254.

The black image generating part 252 generates a black image frame and inserts the black image frame between the first and second image frames received from the scaler 225 to provide the second data dividing part 254 with the black image frame.

The second data dividing part 254 divides the image frames received from the black image generating part 252 into the first data group corresponding to the first area and the second data group corresponding to the second area to provide the timing control part 260 with the first and second image data groups.

The timing control part 260 includes a first timing control part 262 and a second timing control part 264. The first timing control part 262 receives the first image data group from the data processing part 250 and the second timing control part 264 receives the second data group from the data processing part 250. In one exemplary embodiment, driving frequencies of the first timing control part 262 and the second timing control part 264 are about 120 Hz, respectively. Accordingly, the display apparatus is driven at about 240 Hz.

Referring again to FIG. 1, the present exemplary embodiment of a display apparatus may further include a light source device 300. The light source device 300 is disposed below the display panel 110 and provides the display panel 100 with light. Exemplary embodiments of the light source device 300 may include a light source module 310 and a light source driving part 350.

Figure 4:
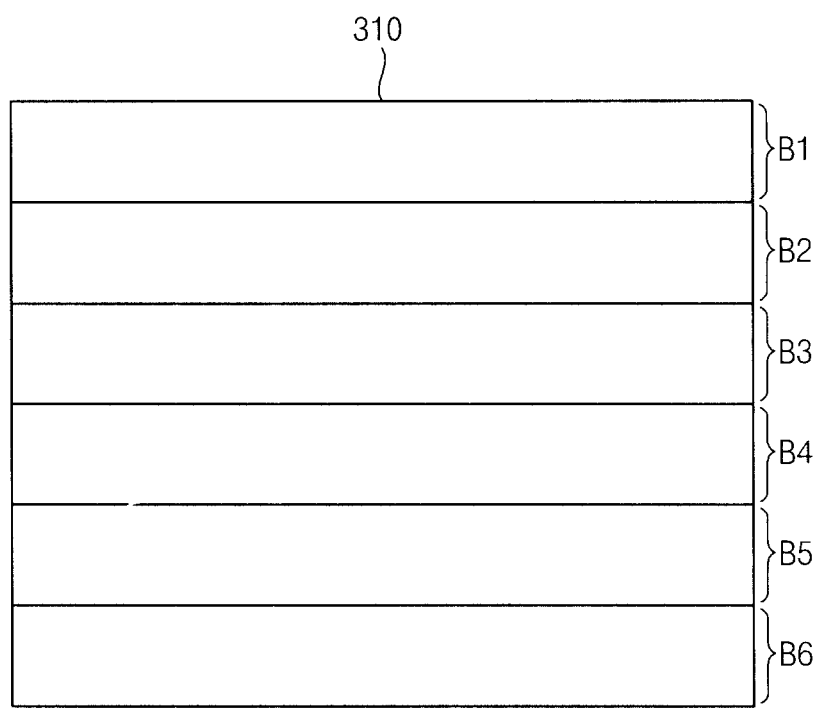
FIG. 4 is a top plan view illustrating an exemplary embodiment of the light source module of FIG. 1.

In one exemplary embodiment, as shown in FIG. 4, the light source module 310 includes a plurality of light-emitting blocks B. In one exemplary embodiment, each of the light-emitting blocks B may include a plurality of light sources. Each of the light source blocks B provides a portion of the display panel corresponding to each of the light source blocks B with the light. Exemplary embodiments include configurations wherein the light sources may be a dot-type light source such as a light-emitting diode ("LED"). Alternative exemplary embodiments include configurations wherein the light source may be a linear-type light source such as a cold cathode fluorescent lamp ("CCFL").

The light source driving part 350 generates a driving signal for driving the light-emitting blocks B in accordance with a controlling of the data processing section 250. The light source driving part 350 drives the light-emitting blocks B using the driving signal.

The light source driving part 350 provides the light-emitting blocks B with the driving signal, so that the light is provided to the display panel 110 while the first and second image frame are displayed thereon. The light source driving part 350 blocks the driving signal provided to the light-emitting blocks B, so that the light is not provided to the display panel 110 while the black image frame generated by the black image generating part 252 is displayed thereon. In addition, the light source driving part 350 blocks the driving signal provided to the light-emitting blocks B, so that the light is not provided to the display panel 110 during a preset interval, in response to the vertical start signal of the first and second image frames.

The light source module 310 may further include an infrared light-emitting part 330. In one exemplary embodiment, the infrared light-emitting part 330 may include a plurality of infrared light sources (for example, infrared light emitting diodes ("IR LEDs")) generating an infrared signal. The infrared light-emitting part 330 generates the infrared signal in response to a synchronization signal for controlling a driving of liquid crystal shutter glasses 400.

The liquid crystal shutter glasses 400 receive the infrared signal corresponding to the synchronization signal from the infrared light-emitting part 300, and provides a first shutter for the left eye and a second shutter for the right eye with the driving signals based on the synchronization signal.

The present exemplary embodiment is explained as an example in which the infrared light-emitting part 330 is included in the light source module 310; however, the invention is not limited to the above-mentioned exemplary embodiment. That is, the infrared light-emitting part 330 may generally be mounted practically anywhere on the exterior of the display apparatus or elsewhere.

Figure 3:
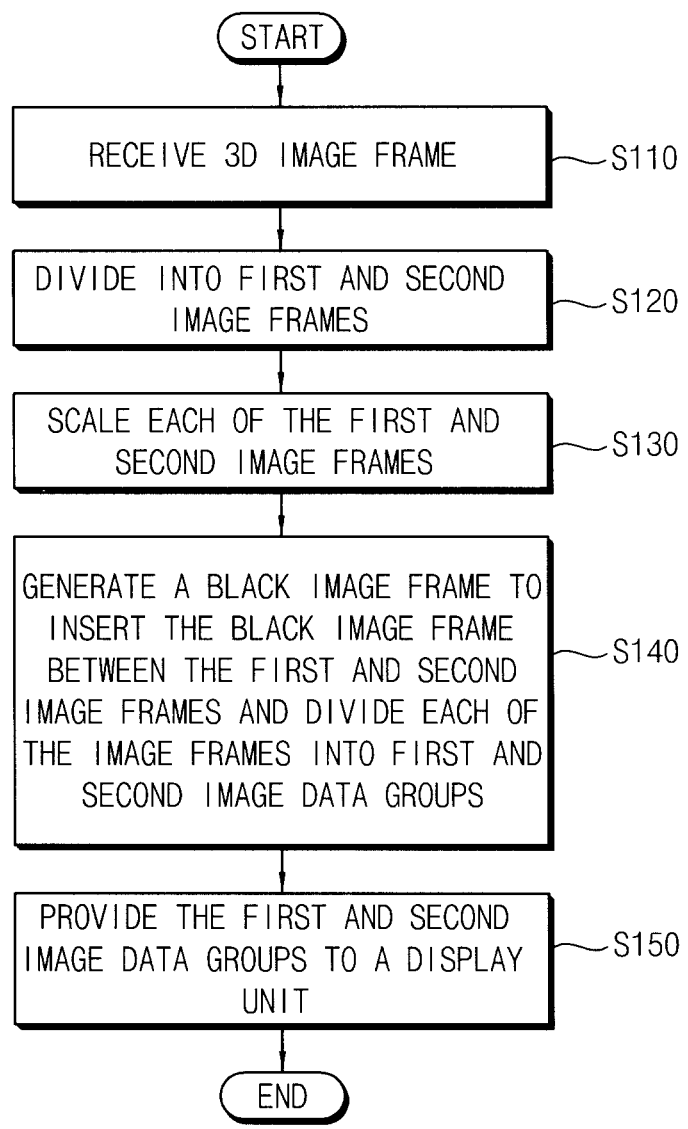
FIG. 3 is a flowchart illustrating an exemplary embodiment of a process of processing a three-dimensional ("3D") image in the image processing board of FIG. 2.

FIG. 3 is a flowchart illustrating a process of processing a 3D image in the image processing board 200 of FIG. 2.

Referring to FIGS. 2 and 3, when the 3D image frame is received from the video system (step S110), the selection part 210 transmits the 3D image frame to the first data dividing part 220 in response to the 3D enable signal 210a.

The first data dividing part 220 divides the 3D image frame received from the selection part 210 into the first and second image frames to transmit the first and second image frames to the scaler 225 (step S120).

The scaler 225 converts the resolutions of the first and second image frames received from the first data dividing part 220 into the resolution of the display panel 110 to transmit the first and second image frames to the data processing section 250 (step S130).

The data processing part 250 generates the black image frame to be inserted between the first and second image frames, and divides each of the first and second image frames into the first image data group and the second image data group to respectively transmit the first and second image data groups to the first and second timing control part 262 and 264, respectively (step S140).

The first and second timing control parts 262 and 264 respectively provide the first and second image data groups to the display unit 100 (step S150). The first image group is displayed on a first display area of the display panel 110 and the second image group is displayed on a second display area adjacent to the first display area.

Figure 5:
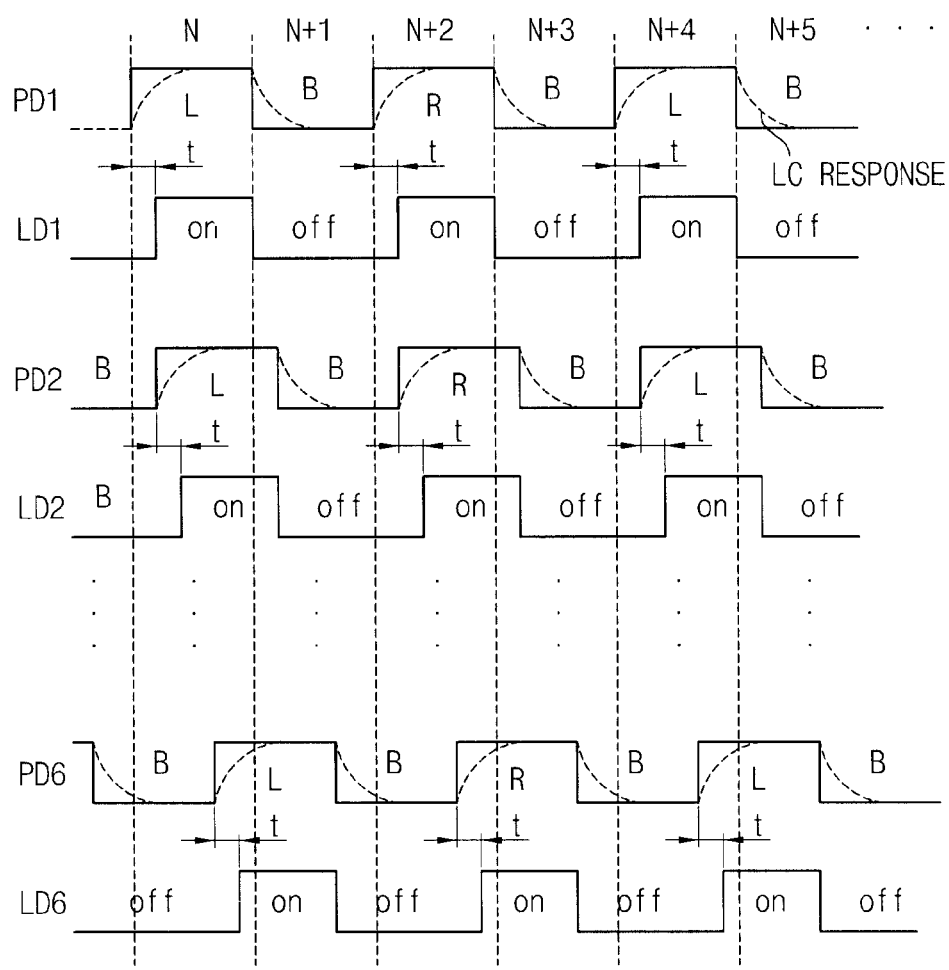
FIG. 5 is waveform diagram illustrating an exemplary embodiment of a method for displaying the 3D image according to an exemplary embodiment of the display apparatus of FIG. 1.

FIG. 4 is a top plan view illustrating an exemplary embodiment of the light source module of FIG. 1. FIG. 5 is waveform diagram illustrating an exemplary embodiment of a method for displaying the 3D image according to an exemplary embodiment of the display apparatus of FIG. 1.

Referring to FIGS. 1 and 4, the light source module 310 may include a plurality of light-emitting blocks B1 to B6. As described above, in one exemplary embodiment each of the light-emitting blocks B1 to B6 may include a plurality of light sources. Each of the light-emitting blocks B1 to B6 provides the display panel 110 with the light in response to the driving signal applied from the light source driving part 350.

In FIG. 5, PD1 to PD6 are waveform diagrams illustrating timing at which the image data is applied to image blocks of the display panel corresponding to the light-emitting blocks B1 to B6, LD1 to LD6 are waveform diagrams illustrating timing at which the driving signal is applied to the light-emitting blocks B1 to B6. In the present exemplary embodiment, image blocks are sections of the display which are aligned with underlying light-emitting blocks B1 to B6.

The first image data for the left eye L, the black image data B, the second image data for the right eye R and the black image data B are sequentially applied to each of the image blocks.

In one exemplary embodiment, the light source driving part 350 blocks the driving signals applied to the light-emitting blocks B1 to B6, so that the light is not applied to the display panel 100 during the preset interval 't,' in response to the vertical start signals of the first image frame for the left eye and the second image frame for the right eye. In one exemplary embodiment, the preset interval 't' may be a time corresponding to an initial response interval of the liquid crystal. For example, in one exemplary embodiment the preset interval 't' may be the time taken to approach to about 20% to 30% of the final liquid crystal response rate (100%). Exemplary embodiments include configurations wherein the preset interval 't' may be varied in accordance with characteristics of the liquid crystal material. The preset interval 't' may be varied according to a number of the light-emitting blocks B. In addition, the light source driving part 350 blocks the driving signals applied to the light-emitting blocks B1 to B6 while the black image data is displayed on the display panel 110 to turn off the light-emitting blocks B1 to B6.

For example, in one exemplary embodiment, though the first image data for the left eye L is applied to a first image block of the display panel 110 in the N-th frame, a first light-emitting block B1 of the light source module 310 is not directly turned on, but turned on after the preset interval 't'. In addition, the first light-emitting block B1 is synchronized to be directly turned off when the black image data B is applied to the first image block (without a preset interval), e.g., it is directly turned off in the (N+1)-th frame. In addition, though the second image data for the right eye R is applied to the first image block in the (N+2)-th frame, the first light-emitting block B1 maintains a turn-off state until after the preset interval 't' has expired in the (N+2)th frame. In the (N+2)th frame the first light-emitting block B1 is synchronized to be turned on when the preset interval 't' is passed.

As described above, according to the present exemplary embodiment, the black image frame is inserted between the first image frame for the left eye and the second image frame for the right eye when the 3D image is displayed, thereby preventing the first image for the left eye and the second image for the right eye from mixing. In addition, the light-emitting blocks B1 to B6 are turned off, not to provide the display panel 100 with the light during the preset time 't' in response to the vertical start signal of the first image frame for the left eye and the second image frame for the right eye, thereby preventing crosstalk from being generated due to a slow response of the liquid crystal.

Figure 6:
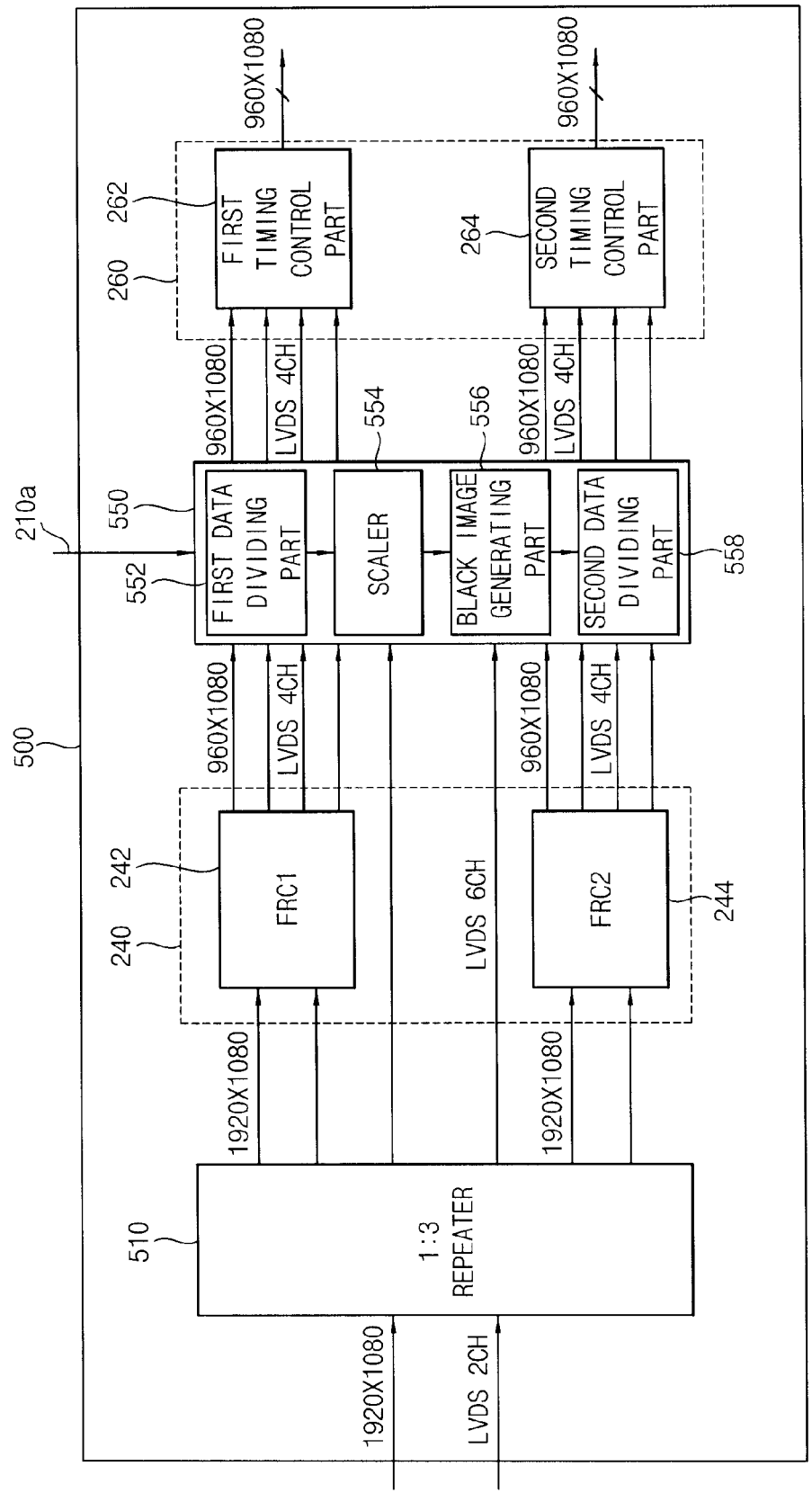
FIG. 6 is a block diagram illustrating an exemplary embodiment of an image processing board according to the present invention.

FIG. 6 is a block diagram illustrating an exemplary embodiment of an image processing board according to the present invention.

Since the image processing board 500 according to the present exemplary embodiment is substantially the same as the image processing board 200 in FIG. 2 except for the inclusion of a 1:3 repeater 510 and a 3D image processing part 550, the same reference numbers will be given to the same components and a repeated explanation will be omitted.

Referring to FIG. 6, the image processing board 500 includes a 1:3 repeater 510, a frame rate controller section 240, a 3D image processing part 550, and a timing control part 260. The frame rate controller section 240 includes a first frame rate control part 242 and a second frame rate control part 244.

The 1:3 repeater 510 divides an image signal of two channels received from the video system equipped in an external device in the LVDS transmission method into an image signal of six channels. A four channel image signal of the image signal of six channels is provided to the frame rate controller section 240, and an image signal of two channels is provided to the 3D image processing part 550. Although the image signal of two channels is shown as being transmitted to the 3D image processing part 550 via the controller section 240, alternative exemplary embodiments include configurations wherein the two channel image signal is transmitted directly to the 3D image processing part 550 from the 1:3 repeater 510.

The 3D image processing part 550 determines the image signal input to be a 2D image signal when a 3D enable signal 210a is not received. The 3D image processing part 550 passes the first and second data groups corresponding to the first and second display areas received from the first and second frame rate control parts 242 and 244 to the timing control part 260.

The 3D image processing part 550 determines the image signal input to be a 3D image signal when the 3D enable signal 210a is received from the outside.

The 3D image processing part 550 may include a first data dividing part 552, a scaler 554, a black image generating part 556 and a second data dividing part 558. In one exemplary embodiment, the first data dividing part 552, the scaler 554, the black image generating part 556 and the second data dividing part 558 are all included on a single IC.

The first data dividing part 552 divides the 3D image frame received from the 1:3 repeater 510 into a first image frame and a second image frame to provide to the scaler 554. In the present exemplary embodiment, the first image frame is for the left eye and the second image frame is for the right eye. In one exemplary embodiment, the first and second image frames may include 960×1080 pixel data or 1920×520 image data, respectively.

The scaler 554 converts the resolutions of the first and second image frames received from the first data dividing part 552 into the resolution of the display panel 110.

The black image generating part 556 generates a black image frame and inserts the black image frame between the first and second image frames received from the scaler 554 to provide the black image frame to the second data dividing part 558.

The second data dividing part 558 divides each of the first and second image frames and the black image frame into the first image data group corresponding to the first display area and the second image data group corresponding to the second display area to provide the first and second data groups to the timing control part 260.

As discussed with respect to the previous exemplary embodiment, the timing control part 260 includes a first timing control part 262 and a second timing control part 264. The first and second control parts 262 and 264 are driven at a driving frequency of about 240 Hz, respectively. The first and second timing control parts 262 and 264 provide the first and second image data groups received from the 3D image processing part 550 to the data driving part 132.

The timing control part 260 controls a display order of the image frames, so that the image frames output from the 3D image processing part 550 are sequentially displayed on the display panel 110.

Figure 7:
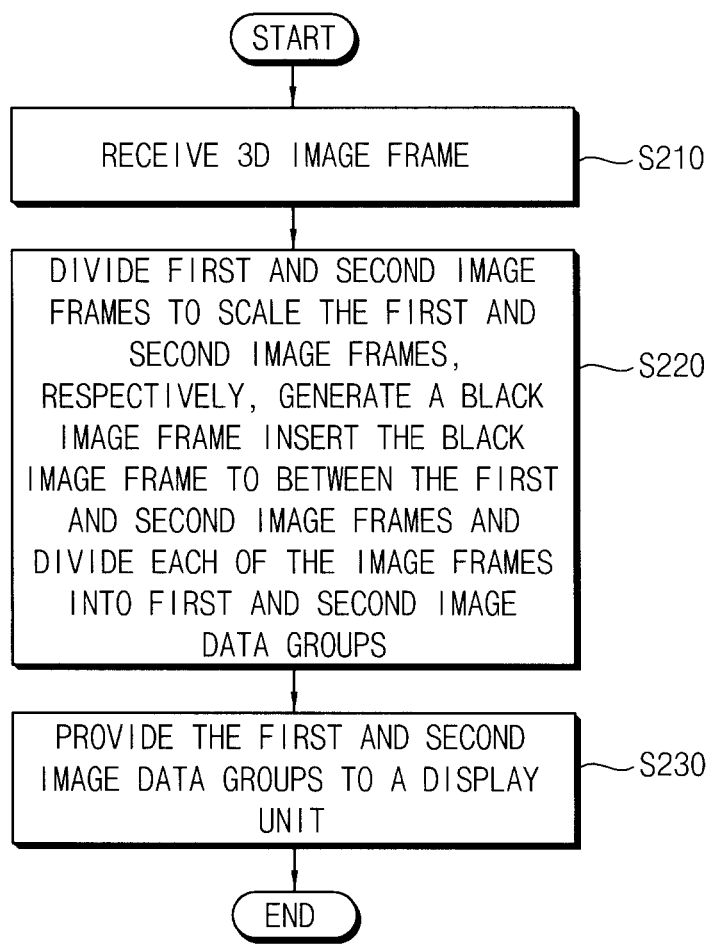
FIG. 7 is a flowchart illustrating an exemplary embodiment of a process of processing a 3D image in the image processing board of FIG. 6.

FIG. 7 is a flowchart illustrating an exemplary embodiment of a process of processing a 3D image in the image processing board 500 of FIG. 6.

Referring to FIGS. 6 and 7, when the 3D image frame is received from the video system (step S210), the 1:3 repeater 510 divides two channels into six channels to transmit the 3D image frame to the 3D image processing part 550 through the six channels.

The 3D image processing part 550 divides the 3D image frame received from the 1:3 repeater 510 into the first and second image frames corresponding to the left eye image frame and the right eye image frame in response to the 3D enable signal 210a output from the video system, converts the resolution of each of the first and second image frames into the resolution of the display panel 110, generates a black image frame to be inserted between the first and second image frames and divides each of the image frames into the first and second image data groups to provide the first and second image data groups to each of the first and second timing control parts 262 and 264, respectively (step S220).

The first and second timing control parts 262 and 264 provide the first and second image data groups to the display unit 100 (step S230). The first image data group is displayed in the first display area of the display panel 110 and the second image data group is displayed in the second display area adjacent to the first display area.

Since a method of displaying a 3D image according to the present exemplary embodiment is substantially the same as the method of display a 3D image according to the previous example embodiment in FIG. 5, the explanation of the exemplary embodiment of a method of displaying a 3D image according to the present exemplary embodiment will be omitted.

According to the present exemplary embodiment, the selection part 210, a first data dividing part 220 and a scaler 225, which are mounted on separate ICs, are integrated on one chip, thereby simplifying a linear-type structure of the image processing board 500.

Figure 8:
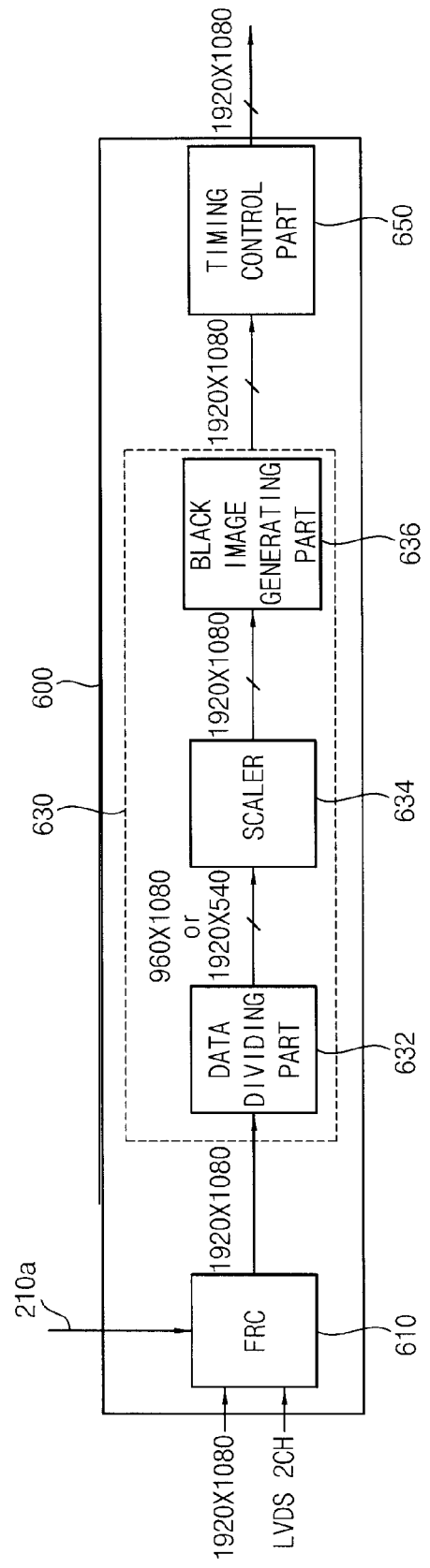
FIG. 8 is a block diagram illustrating an exemplary embodiment of an image processing board according to the present invention.

FIG. 8 is a block diagram illustrating an exemplary embodiment of an image processing board according to the present invention.

Referring to FIGS. 1 and 8, the current exemplary embodiment of an image processing board 600 includes a frame rate control part 610, a 3D image processing part 630 and a timing control part 650.

The frame rate control part 610 determines an image signal input to be a 3D image signal when a 3D enable signal 210a is received from an external source to pass the image signal to the 3D image processing part 630. The frame rate control part 610 determines the image signal to be a 2D image signal when the 3D enable signal 210a is not received from the external source to convert a frame rate of the image signal into a frame rate of the display panel 110. A driving frequency of the frame rate control part 610 is about 240 Hz. In one exemplary embodiment, the frame rate control part 610 converts an image of FHD having 1920×1080 resolution input at about 60 Hz into a frame rate of about 240 Hz.

Exemplary embodiments of the 3D image processing part 630 may include a data dividing part 632, a scaler 634 and a black image generating part 636.

The data dividing part 632 divides the 3D image frame received from the frame rate control part 610 into a first image frame for the left eye image frame and a second image frame for the right eye image frame, respectively, to provide the first and second image frames to the scaler 634. In one exemplary embodiment, the first and second image frames may include 960×1080 pixel data or 1920×520 image data, respectively.

The scaler 634 converts the resolution of each of the first and second frames received from the data dividing part 632 into the resolution of the display panel 110.

The black image generating part 636 generates a black image frame to be inserted between the first and second image frames received from the scaler 554 to provide the timing control part 650 with the black image frame.

The timing control part 650 sequentially provides the first image frame, the black image frame and the second image frame received from the 3D image processing part 630 to a display unit. In one exemplary embodiment, the timing control part 650 is driven at a driving frequency of about 240 Hz.

Figure 9:
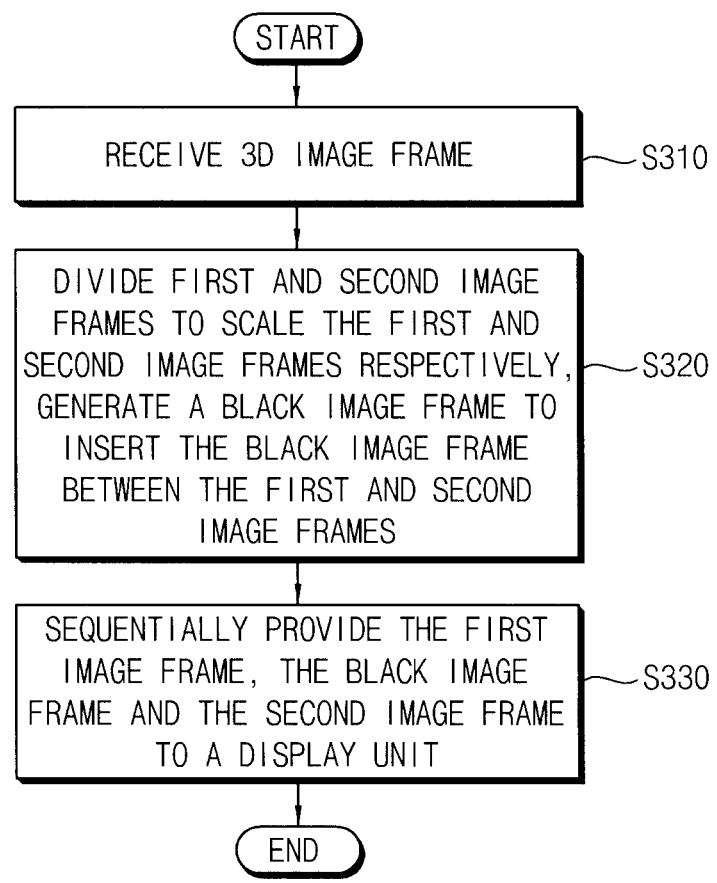
FIG. 9 is a flowchart illustrating an exemplary embodiment of a process of processing a 3D image in the image processing board of FIG. 8.

FIG. 9 is a flowchart illustrating an exemplary embodiment of a process of processing a 3D image in the image processing board 600 of FIG. 8.

Referring FIGS. 8 and 9, the 3D image frame is received from the external source (step S310), the frame rate control part 610 transmits the 3D image frame to the 3D image processing part 630.

The 3D image processing part 630 divides the 3D image frame received from the frame rate control part 610 into the first image frame for the left eye and the second image frame for the right eye, converts the resolution of each of the first image frame and the second image frame into the resolution of the display panel 110, and generates the black image frame to be inserted between the first and second image frames to provide the black image frame to the timing control part 650 (step S320).

The timing control part 650 sequentially transmits the first image frame, the black image frame and the second image frame received from the 3D image processing part 630 to the display unit (step S330). The first, second and black image frames are displayed on the display panel in an order of the first image frame, the black image frame and the second image frame.

Since a method of displaying a 3D image according to the present exemplary embodiment is substantially the same as the method of displaying a 3D image described with reference to FIG. 5, the explanation of the method of displaying a 3D image according to the present exemplary embodiment will be omitted.

Alternative exemplary embodiments include configurations wherein the 3D image processing part 630 may be integrated with the frame rate control part 610 and together the 3D image processing part 630 and the frame rate control part 610 may form one IC, or may be integrated with the timing control part 650 to form one IC.

According to the present exemplary embodiment, a linear-type structure of the image processing board 600 may be simplified.

Figure 10:
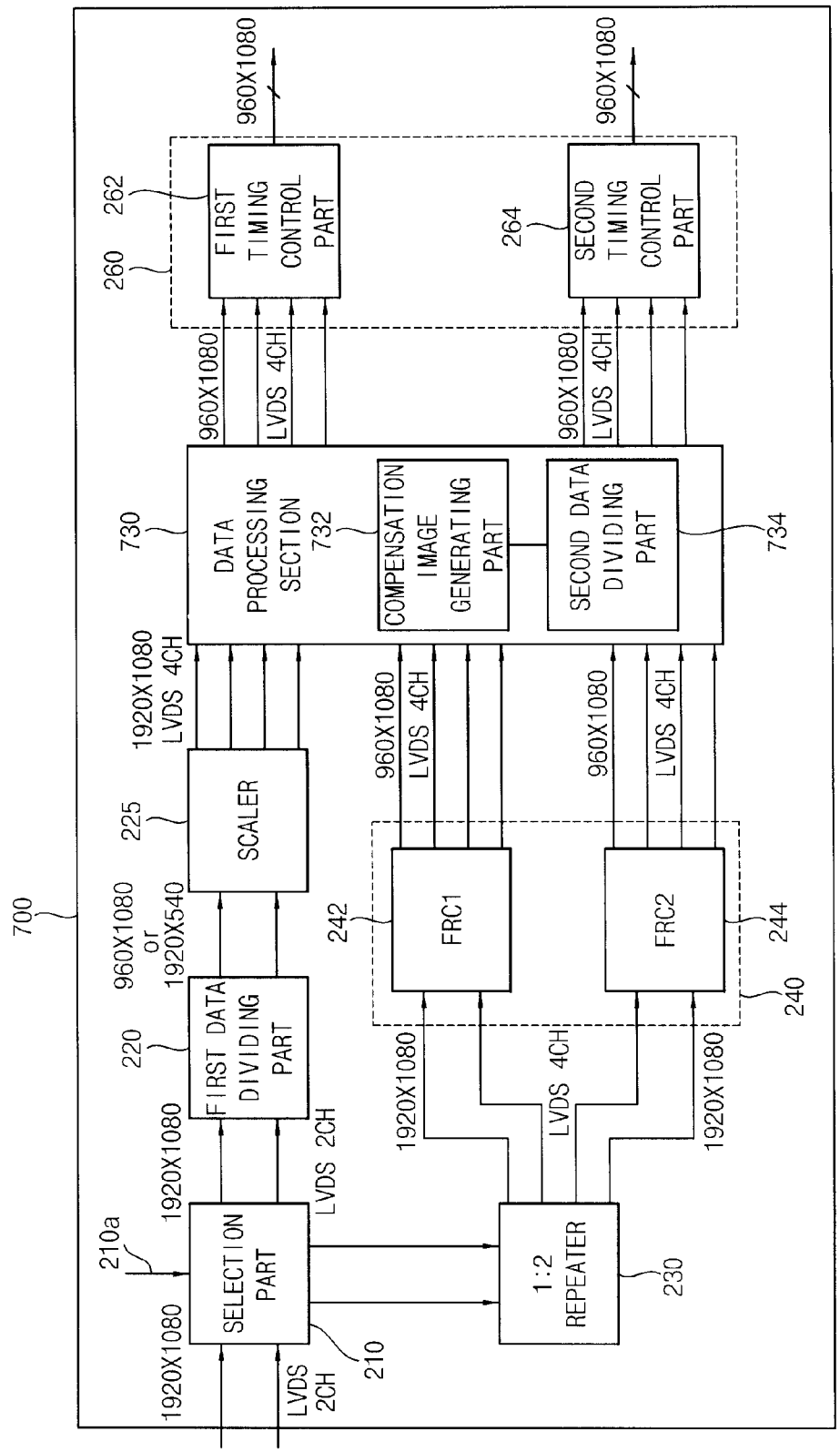
FIG. 10 is a block diagram illustrating an exemplary embodiment of an image processing board according to the present invention.

FIG. 10 is a block diagram illustrating an exemplary embodiment of an image processing board according to the present invention.

Since the image processing board 700 according to the present exemplary embodiment is substantially the same as the exemplary embodiment of an image processing board 200 in FIG. 2 except for a data processing section 730, the same reference numbers will be given to the same components and a repeated explanation will be omitted.

Referring to FIGS. 1 and 10, the image processing board 700 may include a selection part 210, a first data dividing part 220, a scaler 225, a 1:2 repeater 230, a frame rate controller section 240, a data processing section 730 and a timing control part 260.

In one exemplary embodiment, the data processing section 730 may include a compensation image generating part 732 and a second data dividing part 734.

The compensation image generating part 732 generates a first compensation frame to be displayed next to the first image frame and a second compensation frame to be displayed next to the second image frame and provides the first and second compensation frames to the second dividing part 734. In one exemplary embodiment, the first compensation frame is substantially the same as the first image frame and the second compensation frame is substantially the same as the second image frame.

The second data dividing part 734 divides each of the first and second image frames and the first and second compensation frames into a first image data group corresponding to a first display area of the display panel 100 and a second image data group corresponding to a second display area adjacent to the first display area to provide the first and second image data groups to the timing control part 260.

Similar to the previous exemplary embodiments, in the present exemplary embodiment the timing control part 260 includes a first timing control part 262 and a second timing control part 264. The first timing control part 262 receives the first image data group from the data processing part 730 and the second timing control part 264 receives the second image data group from the data processing part 730. In one exemplary embodiment, driving frequencies of the first timing control part 262 and the second timing control part 264 are about 240 Hz, respectively. The first timing control part 262 and the second timing control part 254 provide the first and second image data groups to the display apparatus at the same time, so that in one exemplary embodiment the display apparatus is driven at about 240 Hz.

Figure 11:
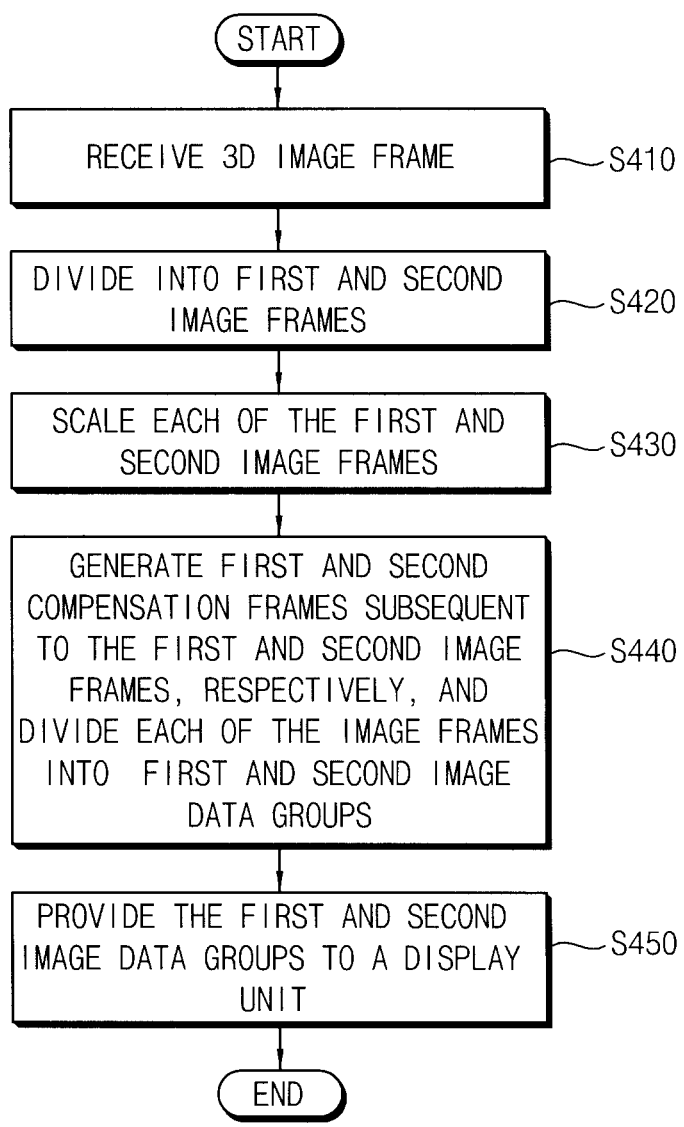
FIG. 11 is a flowchart illustrating an exemplary embodiment of a process of processing a 3D image in the image processing board of FIG. 10.

FIG. 11 is a flowchart illustrating a process of processing a 3D image in the image processing board 700 of FIG. 10.

Figure 12:
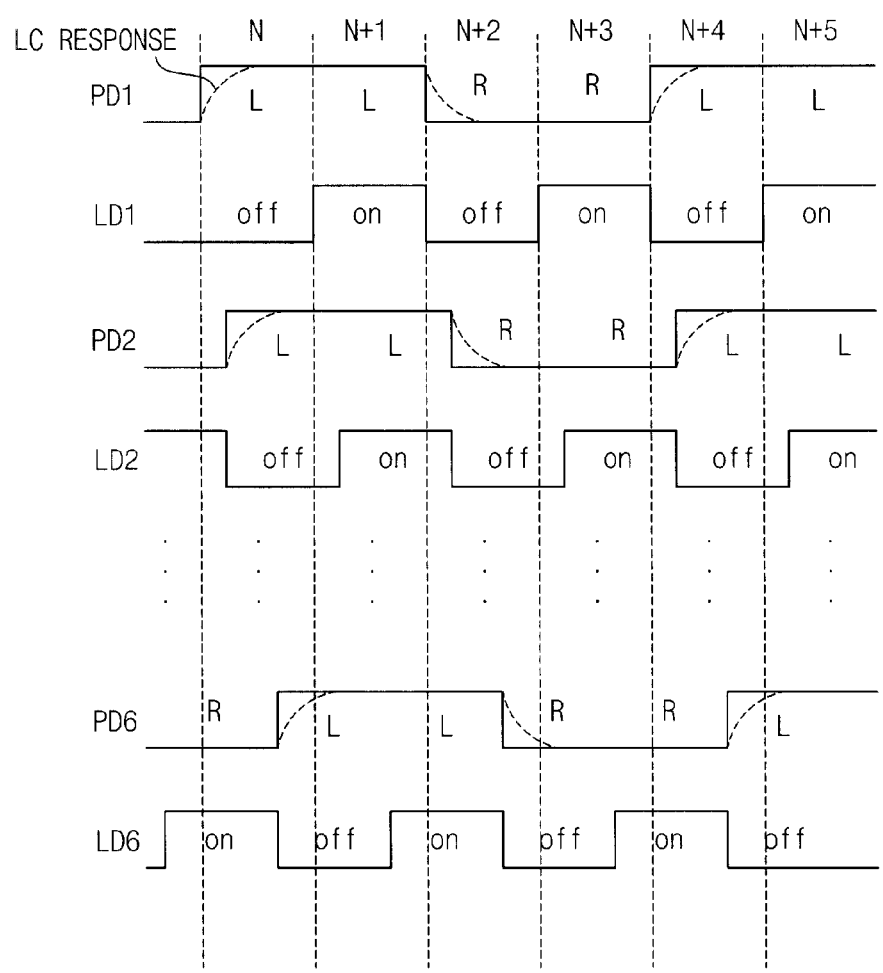
FIG. 12 is a waveform diagram illustrating an exemplary embodiment of a method for displaying a 3D image in FIG. 10.

Referring to FIGS. 11 and 12, the 3D image frame is received from the outside (step S410), and the selection part 210 transmits the 3D image frame to the first data dividing part 220.

The first data dividing part 220 divides the 3D image frame received from the selection part 210 into the first and second image frames to transmit the first and second image frames to the scaler 225 (step S420).

The scaler 225 converts the resolution of each of the first and second image frames received from the first data dividing part 220 into the resolution of the display panel 110 to provide the first and second image frame to the data processing part 730 (step S430).

The data processing part 730 generates the first compensation frame to be displayed next to, e.g., subsequent to, the first image frame received from the scaler 225 and the second compensation frame to be displayed next to, e.g., subsequent to, the second image frame received from the scaler 225 and divides each of the frames into the first image data group and the second image data group to transmit the first and second image data groups to the first and second timing control parts 262 and 264, respectively (step S440).

The first and second timing control parts 262 and 264 provide the first and second image data groups to the display unit 100 (step S450).

FIG. 12 is a waveform diagram illustrating an exemplary embodiment of a method for displaying a 3D image in FIG. 10.

In FIG. 12, PD1 to PD6 are waveform diagrams illustrating a timing at which the image data is applied to the image blocks of the display panel corresponding to the light-emitting blocks B1 to B6 (shown in FIG. 4) of the light source module 310 and LD1 to LD6 are waveform diagrams illustrating a timing at which the driving signal is applied to the light-emitting blocks B1 to B6.

As shown in FIG. 12, image data is alternately applied to each of the image blocks two frames at a time. For example, in an exemplary embodiment wherein a left eye image data L is applied to an N-th frame and an (N+1)-th frame, a right eye image data R is applied to an (N+2)-th frame and an (N+3)-th frame and the left eye image data L is again applied to an (N+4)-th frame and an (N+5)-th frame.

The light-emitting blocks B1 to B6 providing the light to the display panel turn off during a first frame interval of the two frame intervals to which the same image data is applied. That is, the light-emitting blocks B1 to B6 are synchronized to a vertical start time of a second frame of the two frame intervals to be turned on.

According to the present exemplary embodiment, the same image frame is applied during a two-frames interval and the application of light is synchronized to the vertical start time of the second frame of the two frames to be provided to the display panel, thereby sufficiently ensuring a time during which the liquid crystal may respond and preventing crosstalk from being generated due to a slow response of the liquid crystal.

Figure 13:
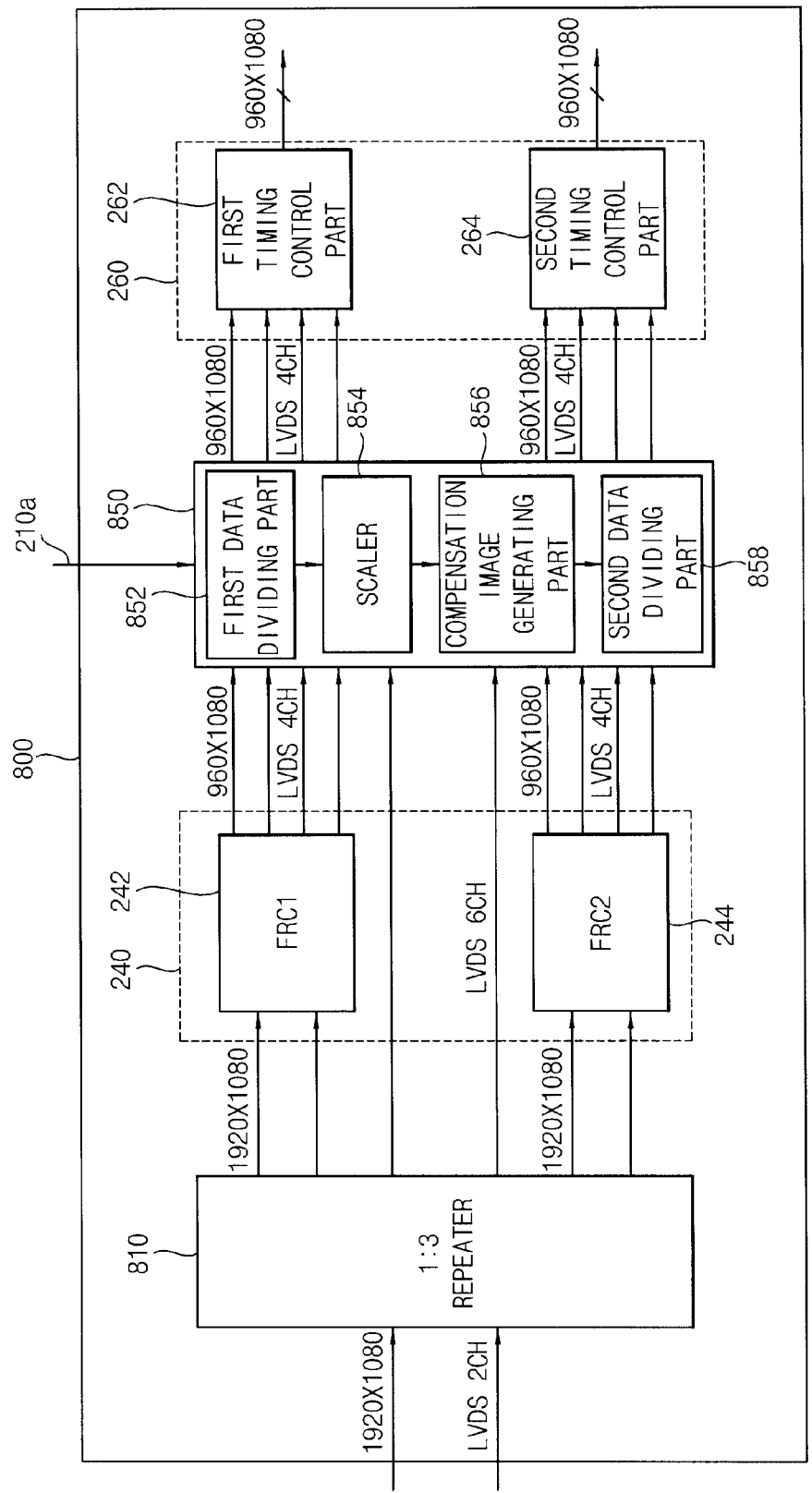
FIG. 13 is a block diagram illustrating an exemplary embodiment of an image processing board according to the present invention.

FIG. 13 is a block diagram illustrating an exemplary embodiment of an image processing board according to the present invention.

Since the image processing board 800 according to the present exemplary embodiment is substantially the same as the exemplary embodiment of an image processing board 500 in FIG. 2 except for a 1:3 repeater 810 and a 3D image processing part 850, the same reference numbers will be given to the same components and a repeated explanation will be omitted.

Referring to FIG. 13, the image processing board 800 includes a 1:3 repeater 810, a frame rate control part 240, a 3D image processing part 850, and a timing control part 260.

The 1:3 repeater 810 divides two channels into six channels to transmit the image signal received from an external source, e.g., a video system, in an LVDS transmission method.

The 3D image processing part 850 may include a first data dividing part 852, a scaler 854, a compensation image generating part 856 and a second data dividing part 858.

The first data dividing part 852 divides the 3D image frame transmitted from the 1:3 repeater 810 into a first image frame and a second image frame corresponding to a first image frame for a left eye and a second image frame for a right eye, respectively, in response to a 3D enable signal 210a transmitted from the video system to provide the first and second image frames to the scaler 854. Again, exemplary embodiments of the correspondence of the first image frame and the second image frame with the left eye and the right eye may be reversed.

The scaler 854 converts the resolution of each of the first and second image frames transmitted from the first data dividing part 852 into the resolution of the display panel 110.

The compensation image inserting part 856 generates a first compensation frame to be displayed next to, e.g., subsequent to, the first image frame and a second compensation frame to be displayed next to, e.g., subsequent to, the second image frame to provide the first and second compensation frames to the second data dividing part 858. In one exemplary embodiment, the first compensation frame is substantially the same as the first image frame and the second compensation frame is substantially the same as the second image frame.

The second data dividing part 858 divides each of the frames received from the compensation image inserting part 856 into a first image data group and a second image data group corresponding to a second display area to provide the first and second image data groups to the timing control part 260.

The timing control part 260 includes a first timing control part 262 and a second timing control part 264. The first timing control part 262 receives the first image data group from the data processing part 250 and the second timing control part 264 receives the second image data group from the data processing part 250. In one exemplary embodiment, driving frequencies of the first and second timing control parts 262 are about 240 Hz, respectively. The first and second timing control part 262 and 264 provide the first and second image data groups to the display unit 100.

Figure 14:
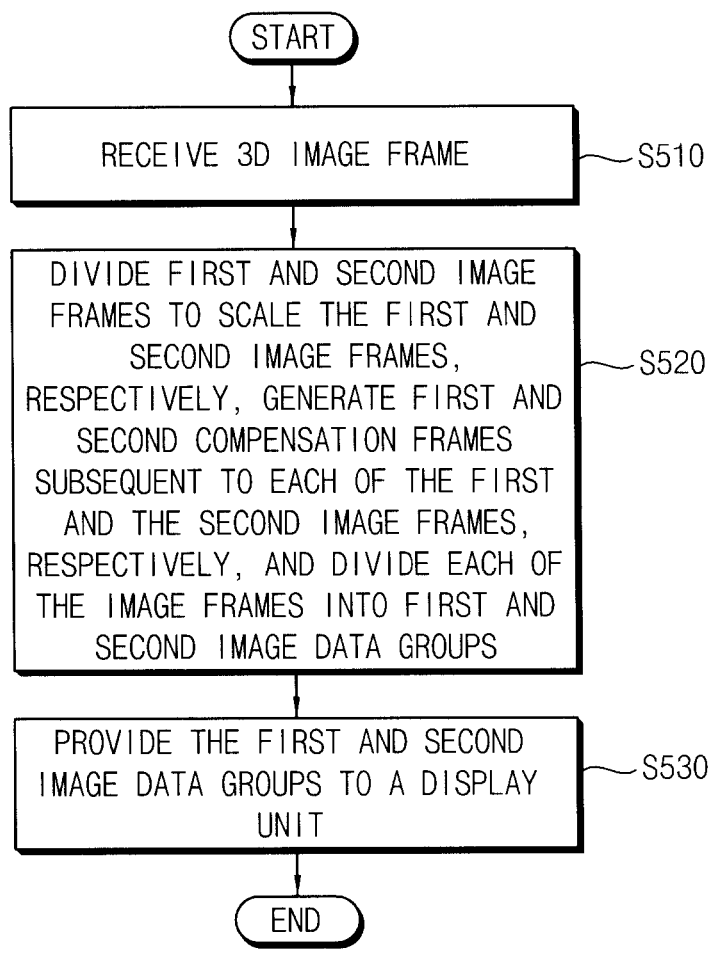
FIG. 14 is a flowchart illustrating an exemplary embodiment of a process of processing a 3D image in the image processing board of FIG. 13.

FIG. 14 is a flowchart illustrating an exemplary embodiment of a process of processing a 3D image in the image processing board of FIG. 13.

Referring to FIGS. 13 and 14, the 3D image frame is received from the external source (step S510), the 1:3 repeater 810 divides two channels into six channels to transmit the 3D image frame to the 3D image processing part 850 through the six channels.

The 3D image processing part 850 divides the 3D image frame received from the 1:3 repeater 810 into the first and second image frames, converts the resolution of each of the first and second image frames into the resolution of the display panel 110, generates the first and second compensation frames subsequent to the first image frame and the second image frame, respectively, and divides each of the frames into the first and second image data groups to provide the first and second image data groups to the first and second timing control parts 262 and 264, respectively (step S520).

The first and second timing control parts 262 and 264 provide the first and second image data groups to the display unit 100 (step S530).

Since a method of displaying a 3D image according to the present exemplary embodiment is substantially the same as the method of display a 3D image described with reference to FIG. 12, the explanation of the method of displaying a 3D image according to the present exemplary embodiment will be omitted.

According to the present exemplary embodiment, a linear-type structure of the image processing board 800 may be simplified. In addition, substantially the same image frame is applied in two frames and the light is provided to the display panel in accordance with the point of the vertical start time of the second frame of the two frames, thereby sufficiently ensuring the time during which the liquid crystal may respond.

Figure 15:
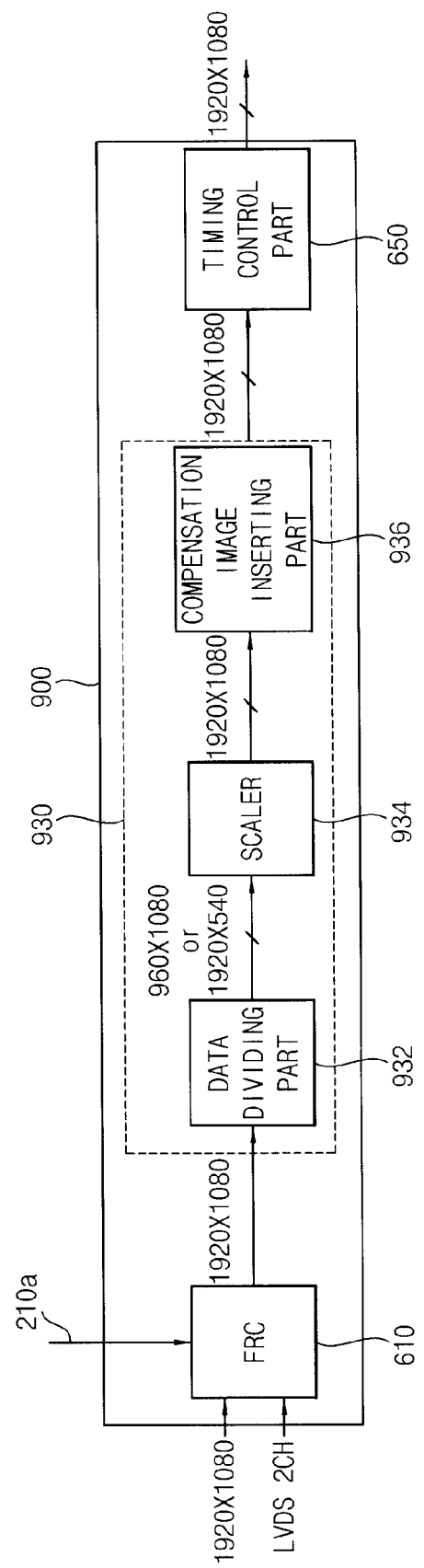
FIG. 15 is a block diagram illustrating an exemplary embodiment of an image processing board according to the present invention.

FIG. 15 is a block diagram illustrating an exemplary embodiment of an image processing board according to the present invention.

Since the image processing board according to the present exemplary embodiment is substantially the same as the image processing board 600 according to the previous exemplary embodiment in FIG. 8 except for a 3D image processing part 930, the same reference numbers will be given to the same components and a repeated explanation will be omitted.

Referring to FIG. 15, the image processing board 900 includes a frame rate control part 610, a 3D image processing part 930 and a timing control part 650.

The frame rate control part 610 determines an image signal input to be a 3D image signal when a 3D enable signal 210a is received from the external source (not shown) to pass the image signal to the 3D image processing part 630. The frame rate control part 610 determines the image signal input to be a 2D image signal when the 3D enable signal 210a is not received from the video system, to convert a frame rate of the image signal into a frame rate of the display panel 110. In one exemplary embodiment, a driving frequency of the frame rate control part 610 is about 240 Hz.

The 3D image processing part 930 includes a data dividing part 932, a scaler 934 and a compensation image inserting part 936.

The data dividing part 932 divides the 3D image frame transmitted from the frame rate control part 610 into a first image frame and a second image frame corresponding to a first image frame for a left eye and a second image frame for a right eye, respectively, to provide the frames to the scaler 934.

The scaler 934 converts the resolution of each of the first and second image frames transmitted from the data dividing part 932 into the resolution of the display panel 110.

The compensation image inserting part 936 generates a first compensation frame to be displayed next to, e.g., subsequent to, the first image frame and a second compensation frame to be displayed next to, e.g., subsequent to, the second image frame respectively transmitted from the scaler 554 to provide the first and second compensation frames to the timing control part 650.

The timing control part 650 sequentially transmits the first image frame, the first compensation frame, the second image frame and the second compensation frame transmitted from the 3D image processing part 630 to the display unit 100. In one exemplary embodiment, a driving frequency of the timing control part 650 is about 240 Hz.

Figure 16:
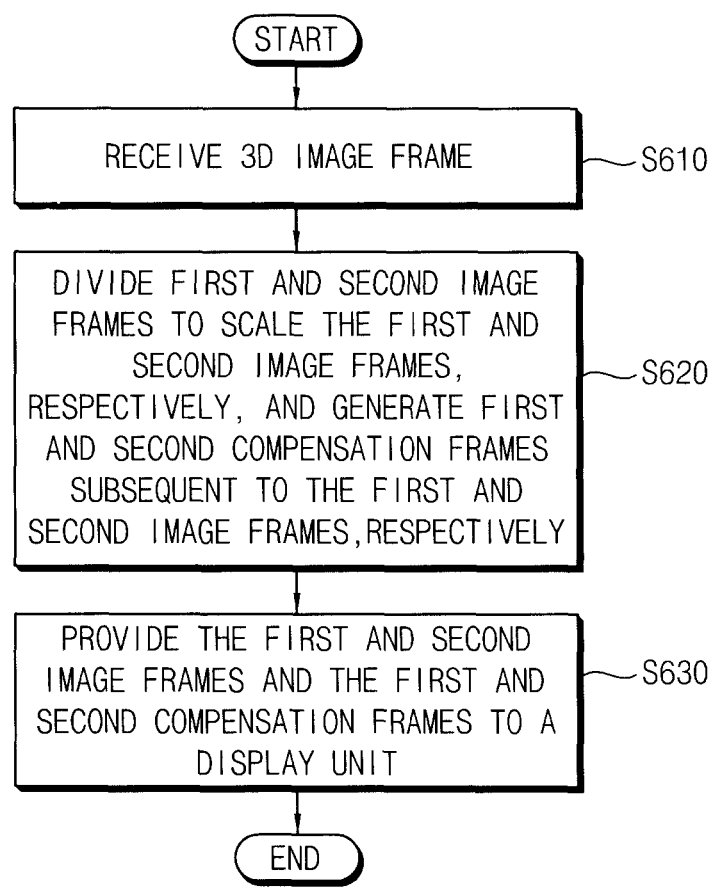
FIG. 16 is a flowchart illustrating an exemplary embodiment of a process of processing a 3D image in the image processing board of FIG. 15.

FIG. 16 is a flowchart illustrating an exemplary embodiment of a process of processing a 3D image in the image processing board of FIG. 15.

Referring to FIGS. 15 and 16, when the 3D image frame is received from the video system (step S610), the frame rate control part 610 transmits the 3D image frame to the 3D image processing part 930.

The 3D image processing part 930 divides the 3D image frame transmitted from the frame rate control part 610 into first and second image frames to convert resolutions of the first and second image frames in the resolution of the display panel 110, respectively. A first compensation frame and a second compensation frame subsequent to the first image frame and the second image frame, respectively, are generated to divide the frames into the first and second image data group. The first and second data groups are provided to the timing control part 650 (step S620).

The timing control part 650 sequentially transmits the first image frame, the first compensation frame, the second image frame and the second compensation frame transmitted from the 3D image processing part 930 to the display unit 100 (step S630).

Since the method of displaying the 3D image according to the present exemplary embodiment is substantially the same as the method of displaying the 3D image described with reference to FIG. 12, an explanation about the method of displaying the 3D image according to the present exemplary embodiment will be omitted.

According to the present exemplary embodiment, a linear-type structure of the image processing board 900 may be simplified. In addition, a time during which the liquid crystal may respond may be sufficiently ensured, thereby preventing crosstalk from being generated.

As described above, according to exemplary embodiments of the present invention, a left eye image and a right eye image may be prevented from being mixed. In addition, a point of a driving time of a light source is controlled in consideration of the response time of liquid crystal, thereby preventing crosstalk from being generated due to a slow response of the liquid crystal. Accordingly, the display quality of a 3D image may be improved.

The foregoing is illustrative of the present invention and is not to be construed as limiting thereof. Although a few exemplary embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method for displaying a three-dimensional image on a display panel of a display apparatus including an image processing device and a display unit, the method comprising:
dividing the three-dimensional image input from an external device into a first image frame corresponding to a first eye of a viewer and a second image frame corresponding to a second eye of the viewer, by using the image processing device; and
generating a first compensation frame and a second compensation frame subsequent to the first image frame and the second image frame, respectively, by using the image processing device;
dividing each of the first image frame, the second image frame, the first compensation frame, and the second compensation frame into a first image data group corresponding to a first display area of the display panel and a second image data group corresponding to a second display area adjacent to the first display area, by using the image processing device; and
displaying the first image data group and the second image data group on the first and second display areas of the display panel in a sequential order, by using the display unit,
wherein the first compensation frame of the first image data group is displayed on the first display area and the second compensation frame of the second image data group is displayed on the second display area in a sequential order.

2. The method of claim 1, wherein the first compensation frame and the second compensation frame are black image frames.

3. The method of claim 2, further comprising:
providing the display panel with light while the first image frame and the second image frame are displayed thereon; and
blocking the light provided to the display panel while the first compensation frame and the second compensation frame are displayed thereon.

4. The method of claim 3, wherein providing the display panel with the light comprises blocking the light provided to the display panel during a preset interval in response to a vertical start signal of the first image frame and the second image frame.

5. The method of claim 1, wherein the first compensation frame is substantially identical to the first image frame, and the second compensation frame is substantially identical to the second image frame.

6. The method of claim 5, further comprising:
blocking light from being provided to the display panel while the first image frame and the second image frame are displayed on the display panel; and
providing the display panel with the light while the first compensation frame and the second compensation frame are displayed on the display panel.

7. The method of claim 1, wherein the first eye is a left eye and the second eye is a right eye.

8. A display apparatus comprising:
a display panel which displays an image; and
an image processing device which divides a three-dimensional image frame input from an external device into a first image frame corresponding to a first eye of a viewer and a second image frame corresponding to a second eye of a viewer, and which generates a first compensation frame and a second compensation frame subsequent to the first image frame and the second image frame, respectively, and which divides each of the first image frame, the second image frame, the first compensation frame, and the second compensation frame into a first image data group corresponding to a first display area of the display panel and a second image data group corresponding to a second display area adjacent to the first display area, and which provides the first image data group and the second image data group to the first and second display areas of the display panel, respectively, to be displayed in a sequential order, wherein the first compensation frame of the first image data group is displayed on the first display area and the second compensation frame of the second image data group is displayed on the second display area in a sequential order.

9. The display apparatus of claim 8, further comprising:
a light source device comprising a light source module having a plurality of light-emitting blocks which provide the display panel with light.

10. The display apparatus of claim 9, further comprising:
an infrared light-emitting part mounted on the light source module, wherein the infrared light-emitting part generates a synchronization signal which controls an operation of three-dimensional glasses in response to the first image frame and the second image frame.

11. The display apparatus of claim 10, wherein the first compensation frame and the second compensation frame are black image frames, and
the light source device provides the display panel with the light while the first image frame and the second image frame are displayed on the display panel and blocks the light from being provided to the display panel while the black image frames are displayed thereon.

12. The display apparatus of claim 11, wherein the light source device blocks the light from being provided to the display panel for a predetermined time in response to a vertical start signal of each of the first image frame and the second image frame.

13. The display apparatus of claim 12, wherein the image processing device comprises:
a three-dimensional image processing part which divides the three-dimensional image frame into the first image frame and the second image frame and which generates a black image frame of the black image frames subsequent to each of the first image frame and the second image frame; and
a timing control part which controls a display order of the first image frame, the second image frame and the black image frames output from the three-dimensional processing part so that the first image frame, the black image frame corresponding to the first compensation frame, the second image frame, and the black image frame corresponding to the second compensation frame are sequentially displayed.

14. The display apparatus of claim 13, wherein driving frequencies of the display panel and the timing control part are about 240 Hz, respectively.

15. The display apparatus of claim 14, wherein the three-dimensional image processing part comprises:
a first data dividing part which divides the three-dimensional image frame into the first image frame and the second image frame;
a scaler which converts resolutions of the first image frame and the second image frame in accordance with a resolution of the display panel;
a black image generating part which generates the black image frame corresponding to the first image frame and the black image frame corresponding to the second image frame subsequent to the first image frame and the second image frame, respectively; and a second data dividing part which divides each of the first image frame, the second image frame and the black image frame into the first image data group corresponding to the first display area of the display panel and the second image data group corresponding to the second display area adjacent to the first display area.

16. The display apparatus of claim 15, wherein the timing control part comprises a first timing control part which receives the first image data group and a second timing control part which receives the second image data group.

17. The display apparatus of claim 10, wherein the first compensation frame is substantially identical to the first image frame, and the second compensation frame is substantially identical to the second image frame, and
the light source device blocks the light from being provided to the display panel while the first image frame and the second image frame are displayed on the display panel, and provides the display panel with the light while the first compensation frame and the second compensation frame are displayed on the display panel.

18. The display apparatus of claim 17, wherein the image processing device comprises:
a three-dimensional image processing part which divides the three-dimensional image frame into the first image frame and the second image frame and inserts the first compensation frame and the second compensation frame subsequent to the first image frame and the second image frame, respectively; and
a timing control part which controls a display order of image frames output from the three-dimensional image processing part so that the first image frame, the first compensation frame, the second image frame and the second compensation frame are sequentially displayed.

19. The display apparatus of claim 18, wherein driving frequencies of the display panel and the timing control part are about 240 Hz, respectively.

20. The display apparatus of claim 18, wherein the three-dimensional processing part comprises:
a first data dividing part which divides the three-dimensional image frame into the first image frame and the second image frame;
a scaler which converts resolutions of the first image frame and the second image frame in accordance with a resolution of the display panel;
a compensation image generating part which generates the first compensation frame and the second compensation frame consecutively to the first image frame and the second image frame, respectively; and
a second data dividing part which divides each of the first image frame and the second image frame and the first compensation frame and the second compensation frame into a first image data group corresponding to a first display area of the display panel and a second image data group corresponding to a second display area adjacent to the first display area.

21. The display apparatus of claim 20, wherein the timing control part comprises a first timing control part which receives the first image data group and a second timing control part which receives the second image data group.

* * * * *